US012707210B2

(12) United States Patent
Leuthold

(10) Patent No.: US 12,707,210 B2
(45) Date of Patent: Aug. 11, 2026

(54) EAR PIECE FOR A HEARING DEVICE

(71) Applicant: SONOVA AG, Staefa (CH)

(72) Inventor: Markus Leuthold, Staefa (CH)

(73) Assignee: Sonova AG, Staefa (CH)

( * ) Notice: Subject to any disclaimer, the term of this patent is extended or adjusted under 35 U.S.C. 154(b) by 237 days.

(21) Appl. No.: 17/868,470

(22) Filed: Jul. 19, 2022

(65) Prior Publication Data

US 2023/0034479 A1 Feb. 2, 2023

(30) Foreign Application Priority Data

Jul. 21, 2021 (EP) .................................... 21187003

(51) Int. Cl.
*H04R 25/00* (2006.01)
*H04R 1/10* (2006.01)

(52) U.S. Cl.
CPC ......... *H04R 25/652* (2013.01); *H04R 1/1058* (2013.01); *H04R 2225/023* (2013.01); *H04R 2225/025* (2013.01)

(58) Field of Classification Search
CPC ................ H04R 25/652; H04R 1/1058; H04R 2225/77; H04R 2225/023; H04R 2225/025
USPC ................................. 381/312, 322, 324, 328
See application file for complete search history.

(56) References Cited

U.S. PATENT DOCUMENTS 2,430,229 A 11/1947 Kelsey
2011/0019849 A1 1/2011 Nielsen
2013/0056295 A1* 3/2013 Campbell ............ H04R 25/652 181/135
2016/0166203 A1* 6/2016 Goldstein .......... A61B 5/02055
2016/0381472 A1 12/2016 Feeley et al.
(Continued)

FOREIGN PATENT DOCUMENTS

CN 202077178 U 12/2011
EP 3672284 A2 6/2020
(Continued)

OTHER PUBLICATIONS

Voss, Susan et al., "Measurements of ear-canal cross-sectional areas from live human ears with implications for wideband acoustic immittance measurements", The Journal of the Acoustical Society of America, American Institute of Physics, 2 Huntington Quadrangle, Melville, NY 11747, vol. 148, No. 5, Nov. 24, 2020 (Nov. 24, 2020), pp. 3042-3051, XP012251758, ISSN: 0001-4966, DOI: 10.1121/10.0002358.
(Continued)

*Primary Examiner* — George C Monikang
(74) *Attorney, Agent, or Firm* — ALG Intellectual Property, LLC

(57) ABSTRACT

An ear piece for a hearing device includes one of two, three four or more shapes, wherein the ear piece comprises a tube having a first bend separating two essentially straight sections of the tube which smoothly merge into one another at the first bend, wherein each section has a respective centerline, wherein the centerlines enclose an angle between them, wherein the angle is in a range of 41° to 58°, wherein the centerlines meet at an intersection point lying within an bend plane having a plane area confined by the tube, and wherein the bend plane bisects the angle with a tolerance range of 5% and/or is rotated within the tube about the intersection point so as to minimize the plane area.

13 Claims, 3 Drawing Sheets

(56) References Cited

U.S. PATENT DOCUMENTS

| | | | | |
|---|---|---|---|---|
| 2018/0367926 | A1* | 12/2018 | Marcher | H04R 25/656 |
| 2020/0237307 | A1* | 7/2020 | Sato | A61B 5/291 |

FOREIGN PATENT DOCUMENTS

| | | | |
|---|---|---|---|
| EP | 3739905 | A1 | 11/2020 |
| WO | 2013149645 | | 10/2013 |

OTHER PUBLICATIONS

"European Search Report received in International Application No. EP21187003 dated Jan. 6, 2022.".

Office Action received in European Patent Application No. 21187003.5, dated Oct. 11, 2024.

Summons received in EP Patent Application No. 21187003.5 on Jan. 29, 2026.

* cited by examiner

EAR PIECE FOR A HEARING DEVICE

RELATED APPLICATIONS

The present application claims priority to EP Patent Application No. EP21187003, filed Jul. 21, 2021, the contents of which are hereby incorporated by reference in their entirety.

BACKGROUND INFORMATION

There is a large variation in the shape of human ears. An ear piece has to accommodate these shape variations. Normally, the actual ear canal shape is determined by an impression scan or direct ear scan and a custom ear piece is built based on the scanned shape data. This ensures good quality with respect to wearing comfort and acoustical sealing performance.

However, this approach also has drawbacks: The process to get the custom ear piece is cumbersome. First, one needs to have ones ear scanned by a hearing care professional, the ear impression has to be sent back to the manufacturer, and it has to be scanned. The custom ear piece has to be modeled in a shell modeling software, the hearing device with the ear piece then needs to be 3D printed and assembled and sent back to the customer. This process is slow and complicated.

As an alternative, a dome could be used. A dome is immediately available to the customer. However, it lacks good sealing and retention in the ear.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

Corresponding parts are marked with the same reference symbols in all figures.

DETAILED DESCRIPTION

Figure 1:
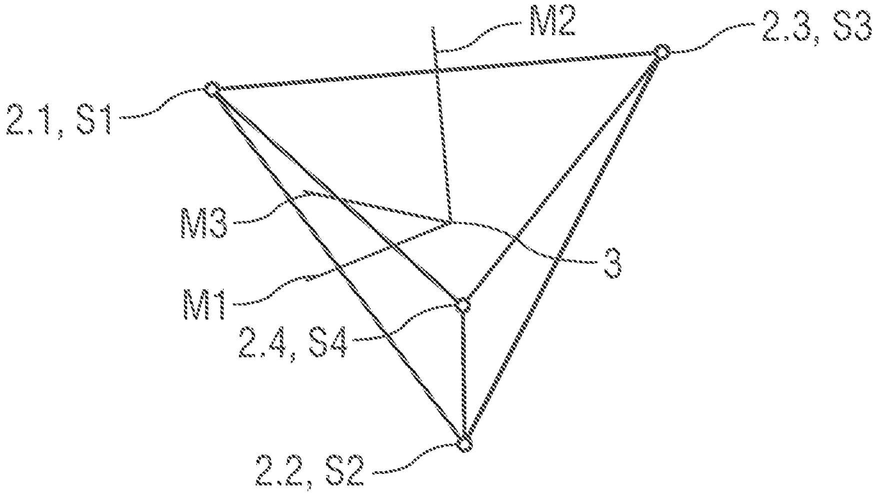
FIG. 1 is a schematic view of a representation of four universal ear pieces having different shapes in a simplified statistical shape model.

Described herein are embodiments related to an ear piece for a hearing device.

It is a feature of the embodiments described herein to provide an intermediate solution for an ear piece to bridge the time gap until a customized ear piece has been manufactured.

In some embodiments, an ear piece for a hearing device may have one of two, three four or more defined shapes, wherein the ear piece comprises a tube having a first bend separating two essentially straight sections of the tube which smoothly merge into one another at the first bend, wherein each section has a respective centerline, which may be imaginary. The centerlines enclose an angle between them, wherein the angle is in a range of 41° to 58°. The centerlines meet at an intersection point lying within a bend plane having a plane area confined by the tube. The bend plane may likewise be imaginary. The bend plane bisects the angle with a tolerance range of 5% and/or is rotated within the tube about the intersection point so as to minimize the plane area, wherein the plane area is in the range of

- –44 $mm^2$ to 53 $mm^2$, in particular 48 $mm^2$ ±1 $mm^2$, for a first shape,
- –53 $mm^2$ to 67 $mm^2$, in particular 60 $mm^2$ ±1 $mm^2$, for a second shape,
- –65 $mm^2$ to 83 $mm^2$, in particular 75 $mm^2$ ±1 $mm^2$, for a third shape, and
- –73 $mm^2$ to 92 $mm^2$, in particular 84 $mm^2$ ±1 $mm^2$, for a fourth shape.

The expression "first bend" is used here to reflect that the said bend corresponds to what is known as the "first bend" in anatomy. Usage of the expression "first bend" does not imply that the ear piece has to have more than one bend.

Minimizing the plane area by rotating the bend plane about the intersection point may result in the bend plane bisecting the angle with the above mentioned tolerance and vice versa. The plane area may have several minima but one absolute minimum and minimizing the plane area may signify arriving at one of the minima or at the absolute minimum. As both the centerlines and the bend plane are imaginary, both entities are merely used here to define the geometry of the ear piece. In particular, the ear piece may not comprise an actual embodied rotatable bend plane.

In an exemplary embodiment, the angle is in a range of

- –42° to 47°, in particular 45°±1°, for the first shape,
- –51° to 58°, in particular 55°±1°, for the second shape,
- –41° to 46°, in particular 43°±1°, for the third shape and
- –41° to 46°, in particular 44°±1°, for the fourth shape.

In an exemplary embodiment, the bend plane or the contour of the intersection of the bend plane and the tube is oval or approximated by an oval, e.g. elliptical, and has a major axis and a minor axis which span the bend plane, wherein a length of the major axis is

- –8 mm to 10 mm, in particular 9 mm±1 mm, for the first shape,
- –10 mm to 13 mm, in particular 11 mm±1 mm, for the second shape,
- –10 mm to 13 mm, in particular 12 mm±1 mm, for the third shape and
- –12 mm to 15 mm, in particular 13 mm±1 mm, for the fourth shape.

In an exemplary embodiment, a length of the minor axis is

- –6.2 mm to 7.2 mm, in particular 6.7 mm±0.2 mm, for the first shape,
- –6.2 mm to 7.2 mm, in particular 6.7 mm±0.2 mm, for the second shape,
- –7.6 mm to 8.8 mm, in particular 8.2 mm±0.2 mm, for the third shape
- –7.5 mm to 8.7 mm, in particular 8.1 mm±0.2 mm, for the fourth shape.

In an exemplary embodiment, the major axis is at least approximately perpendicular to a plane spanned by the centerlines or the major axis lies within a plane which is at least approximately perpendicular, e.g. at an angle from 70° to 90°, to the center line. The major axis and the minor axis lie in the bend plane. The major axis is approximately perpendicular, e.g. at an angle from 70° to 90°, to the center line.

The centerlines discussed herein are averaged or approximated centerlines of the tube sections which do not necessarily have a perfect circular cylindrical shape. The centerlines may for example be averaged or approximated across a length of the respective tube section in the order of magnitude of the length of the major axis and/or the minor axis, e.g. in a range from 6 mm to 15 mm, in particular 8 mm.

In an exemplary embodiment, the minor axis is perpendicular to the major axis.

In an exemplary embodiment, the ear piece comprises or consisting of an elastic material.

In an exemplary embodiment, the material is silicone.

In an exemplary embodiment, the material has a shore A hardness of at most 70.

In an exemplary embodiment, the ear piece has a wall thickness of at most 1.5 mm, e.g., at most 0.7 mm.

In an exemplary embodiment, the ear piece is made by molding, casting or thermoforming. In particular, the ear piece is not made by 3D printing. While a customized ear piece is typically made by 3D printing which is a relatively expensive technology, the ear piece described here may be a mass product produced by molding, casting or thermoforming which is much cheaper than 3D printing.

According to an aspect, a set is provided, comprising two, three, four or more ear pieces as described above, wherein each ear piece of the set has a shape different from the shape of any other ear piece of the set.

The ear pieces in the set may for example be configured for use with a left ear of a user. A second set of ear pieces with each ear piece being mirror symmetrical to a respective ear piece in the aforementioned set but otherwise having the same characteristics may be provided for the right ear of the user.

According to an aspect, the ear piece may be used as a temporary solution for a customer. Herein, one of the ear pieces from the set may be selected and provided to the customer, e.g. while producing a customized ear piece.

The solution as described herein allows for providing a customer with a sufficiently well-fitting universal ear piece immediately so that he may use his hearing device right away and bridge the time gap until he gets a customized ear piece.

Universal ear pieces which are not customized to a particular user and having a first bend reproducing the first bend of the ear canal have not been available in the hearing device industry so far.

Further scope of applicability of the embodiments described herein will become apparent from the detailed description given hereinafter. However, it should be understood that the detailed description and specific examples, while indicating example embodiments, are given by way of illustration only, since various changes and modifications within the spirit and scope of the invention will become apparent to those skilled in the art from this detailed description.

The embodiments described herein provide a solution for an ear piece for a hearing instrument. Normally, a fully custom ear piece matching the shape of a user's ear canal would be needed. In order to bridge the time gap needed to manufacture the customized ear piece, the embodiments described herein provide a set of preformed universal ear pieces (universal tips). The customer or hearing care professional may choose an ear piece out of this set. Typically, the customer will choose the ear piece which fits his ear best. The universal ear pieces are a compromise between a fully customized solution and a one size fits all ear piece. The universal ear pieces are designed such that an optimal compromise between wearing comfort, acoustic sealing and retention can be found, in conjunction with immediate availability.

Initially, a universal ear piece does not exactly match a customer's ear. However, the missing deformation to match the real ear is small enough such that a universal ear piece made out of a soft, elastic material can accommodate the difference between the universal ear piece and the ear such that wearing comfort, sealing and retention are not compromised. It is desirable to keep this initial difference small enough. In an exemplary embodiment, the ear piece may have a wall thickness of at most 1.5 or at most 0.7 mm and the material of which the ear piece is made may have a shore A hardness of at most 70. In an exemplary embodiment, the material may be silicone.

The shapes of the universal ear pieces meet the following requirements to ensure a small difference between the best matching universal ear piece and the real ear:

- Good coverage of the variation of all possible ear shapes
- Shape difference between the universal ear pieces within the set is similar.

The shapes of the universal ear pieces meeting these requirements may be determined based on a statistical shape model (SSM). This determination may be carried out by the methods described in WO2013/149645 A1 which is hereby incorporated by reference in its entirety.

FIG. 1 is a schematic view of a representation of four universal ear pieces having the shapes S1, S2, S3 and S4 in a simplified statistical shape model.

A simplified statistical shape model containing the three most significant modes M1, M2, M3 (result of a principal component analysis on a training set) is assumed. An ear shape can be represented as a weighted linear combination between these three shape modes M1, M2, M3. The corners 2.1, 2.2, 2.3, 2.4 of a tetrahedron 1 with equal length of edges between the corners 2.1, 2.2, 2.3, 2.4 within certain tolerances as shown in FIG. 1 represent the four universal ear pieces. A tetrahedron 1, by definition, meets the following requirement:

- Each corner 2.1, 2.2, 2.3, 2.4 has the same distance to any other corner
- Each corner has the same distance to a center 3 of the tetrahedron 1, wherein the center 3 represents an average ear shape.

The shape difference of the first three modes M1, M2, M3 in the PCA space (SSM) can be exactly quantified and the shape differences are identical between any of the shapes S1, S2, S3, S4 and any other one of the shapes S1, S2, S3, S4 within certain tolerances, e.g. +/−10% of the average shape difference. This is represented by the edges of the tetrahedron 1 having the same length within a tolerance of +/−10% of the average length of the edges. The shape difference in Cartesian space, measured as root mean square distance between shape S1 and shape S2, shape S1 and shape S3, shape S1 and shape S4, shape S2 and shape S3, shape S2 and shape S4, shape S3 and shape S4 is for example in the range of 73 mm to 91 mm.

These are ideal properties of the universal ear pieces in the statistical shape model space which meet the initially mentioned requirements. Assuming we only consider ears whose first three mode weights are within $+/-2*\mathrm{sqrt}(3)*\sigma$($\sigma$ being the standard deviation), there is an upper bound of needed deformation of the closest universal tip to the real ear.

Empirically, it can be shown that the corresponding universal ear pieces in a cartesian coordinate system (the real shape of the ear piece) share similar properties, also with regards to bending energy from the undeformed universal ear piece to the particular ear.

Figure 2:
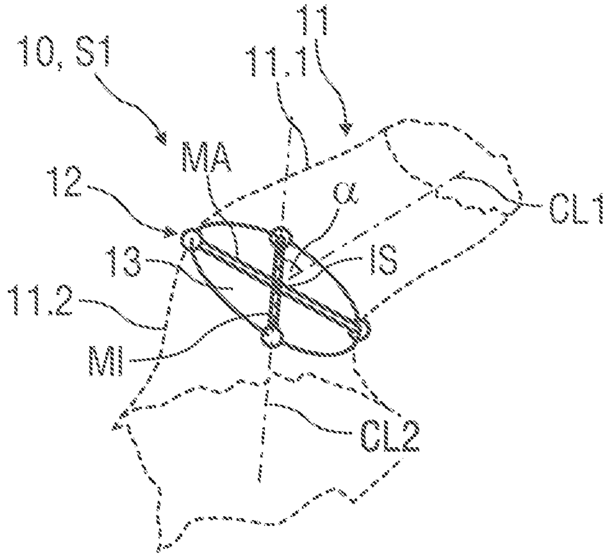
FIG. 2 is a schematic view of an exemplary embodiment of a universal ear piece having a first shape.
Figure 3:
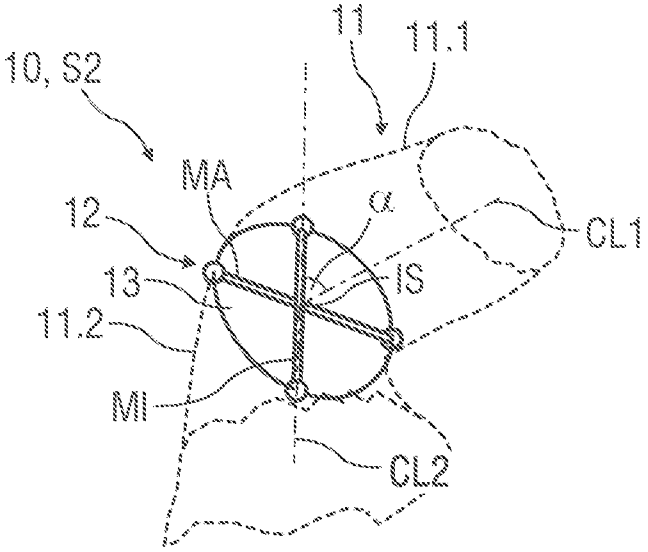
FIG. 3 is a schematic view of an exemplary embodiment of a universal ear piece having a second shape.
Figure 4:
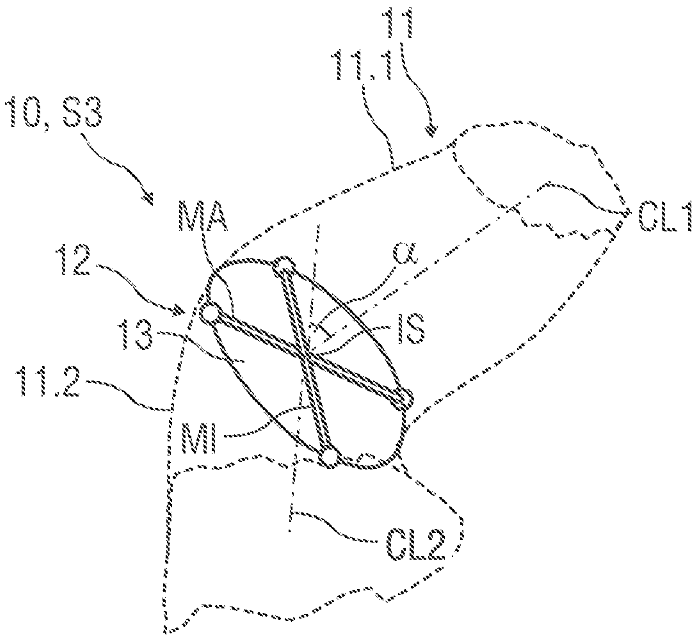
FIG. 4 is a schematic view of an exemplary embodiment of a universal ear piece having a third shape.
Figure 5:
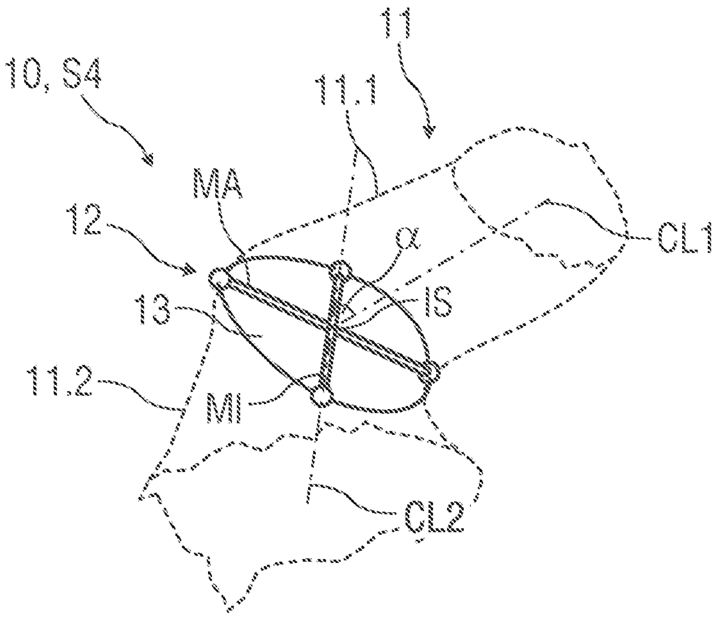
FIG. 5 is a schematic view of an exemplary embodiment of a universal ear piece having a fourth shape.

FIG. 2 is a schematic view of an exemplary embodiment of a universal ear piece 10 having the shape S1. FIG. 3 is a schematic view of an exemplary embodiment of a universal ear piece 10 having the shape S2. FIG. 4 is a schematic view of an exemplary embodiment of a universal ear piece 10 having the shape S3. FIG. 5 is a schematic view of an exemplary embodiment of a universal ear piece 10 having the shape S4. Each ear piece 10 comprises a tube 11 having a first bend 12 separating two essentially straight sections 11.1, 11.2 of the tube 11 which smoothly merge into one another at the first bend 12. If an imaginary bend plane 13 is fit through an intersection point IS of centerlines CL1, CL2 of the two essentially straight sections 11.1, 11.2 and if the bend plane 13 is rotated so as to minimize the area of this bend plane 13 within the tube 11 or within the ear canal for that matter, the bend plane 13 will at least essentially or exactly bisect an angle α between centerlines CL1, CL2 of the two essentially straight sections 11.1, 11.2 of the tube 11. This angle α may be referred to as the concho-meatal angle (CM) (Abel, S. M., Rockley, T., Goldfarb, D. and Hawke, M. (1990) Outer ear canal shape and its relation to the effectiveness of sound attenuating earplugs. J. Otolarngol. 19(2): 92-95.).

The resulting bend plane 13 will typically be oval, e.g. elliptical, and have a major axis MA and a minor axis MI. In an exemplary embodiment, the major axis MA may be at least approximately perpendicular to the centerlines CL1, CL2 or to a plane spanned by the centerlines CL1, CL2. In an exemplary embodiment, the minor axis MI may be perpendicular to the major axis MA.

The ear pieces 10 having the different shapes S1 to S4 differ at the first bend 12 in the parameters given in the following table 1:

| Shape | Length of the major axis MA (mm) | Length of the minor axis MI (mm) | Surface area of the bend plane 13 ($mm^2$) | Angle α (°) |
|---|---|---|---|---|
| S1 | 8 to 10, e.g. 9 | 6.2 to 7.2, e.g. 6.7 | 44 to 53, e.g. 48 | 42 to 47, e.g. 45 |
| S2 | 10 to 13, e.g. 11 | 6.2 to 7.2, e.g. 6.7 | 53 to 67, e.g. 60 | 51 to 58, e.g. 55 |
| S3 | 10 to 13, e.g. 12 | 7.6 to 8.8, e.g. 8.2 | 65 to 83, e.g. 75 | 41 to 46, e.g. 43 |
| S4 | 12 to 15, e.g. 13 | 7.5 to 8.7, e.g. 8.1 | 73 to 92, e.g. 84 | 41 to 46, e.g. 44 |

In FIGS. 2, 3 and 5, the minor axis MI seems to align with the centerline CL2. However, this is just due to the perspective as can be seen when comparing with FIG. 4. In fact, the minor axis MI does not align with any of the centerlines CL1, CL2. Moreover, the orientation of the major axis MA and minor axis MI in FIGS. 2 to 5 relative to the centerlines CL1, CL2 is respectively given as an example and may in other embodiments not necessarily be as it appears in these figures which are 2D representations of a 3D configuration.

Figure 6:
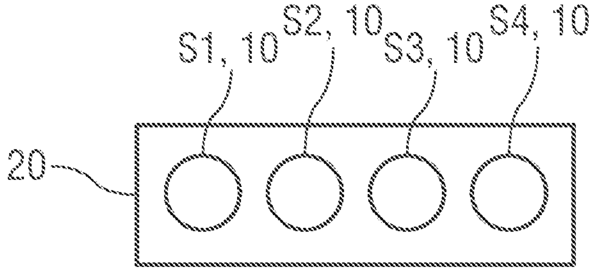
FIG. 6 is a schematic view of a set comprising four ear pieces having the different shapes.
Figure 7:
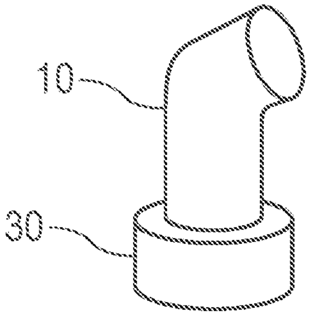
FIG. 7 is a schematic view of a hearing device equipped with one of the ear pieces.

FIG. 6 is a schematic view of a set 20 comprising the four ear pieces 10 having the different shapes S1, S2, S3, S4. FIG. 7 is a schematic view of a hearing device 30 equipped with one of the ear pieces 10. A speaker, also referred to as a receiver, may be arranged within the ear piece 10.

The ear pieces 10 in the set 20 may for example be configured for use with a left ear of a user. A second set of ear pieces 10 with each ear piece 10 being mirror symmetrical to a respective ear piece 10 in the aforementioned set 10 but otherwise having the same characteristics may be provided for the right ear of the user.

The solution described herein may provide one or more of the following features:

- reduces the number of universal tips to a minimum such that they still fit the majority of ears,
- lowers production cost,
- ensures that a good wearing comfort can still be reached in combination with a soft material,
- ensures that the customer immediately gets a usable product after leaving the hearing care professional.

LIST OF REFERENCES

1 tetrahedron
2.1, 2.2, 2.3, 2.4 corner
3 center
10 ear piece
11 tube
11.1, 11.2 section
12 first bend
13 bend plane
20 set
30 hearing device
CL1, CL2 centerline
IS intersection point
M1, M2, M3 mode
MA major axis
MI minor axis
S1, S2, S3, S4 shape
α angle

What is claimed is:

1. A set comprising four or more ear pieces for a hearing device for one ear of a user, wherein each ear piece has one of two, three, four or more shapes different from the shape of any other ear piece of the set, wherein the ear pieces comprise a tube having a first bend separating two essentially straight sections of the tube which smoothly merge into one another at the first bend, wherein each section has a respective centerline, wherein the shapes of each of the four or more ear pieces are determined based on a statistical shape model, wherein the centerlines enclose an angle between them, wherein the angle is in a range of 41° to 58°, wherein the centerlines meet at an intersection point lying within a bend plane having a plane area confined by the tube, wherein the bend plane bisects the angle with a tolerance range of 5% and/or is rotated within the tube about the intersection point so as to minimize the plane area, wherein the plane area is in the range of 44 $mm^2$ to 53 $mm^2$ for a first shape,
53 $mm^2$ to 67 $mm^2$ for a second shape,
65 $mm^2$ to 83 $mm^2$ for a third shape, and
73 $mm^2$ to 92 $mm^2$ for a fourth shape, and wherein the angle is in the range of 42° to 47° for the first shape,
51° to 58° for the second shape,
41° to 46° for the third shape, and
41° to 46° for the fourth shape.

2. The ear piece of claim 1, wherein the bend plane is oval and has a major axis and a minor axis, wherein a length of the major axis is 8 mm to 10 mm for the first shape,
10 mm to 13 mm for the second shape, 10 mm to 13 mm for the third shape, and 12 mm to 15 mm for the fourth shape.

3. The ear piece of claim 2, wherein a length of the minor axis is 6.2 mm to 7.2 mm for the first shape, 6.2 mm to 7.2 mm for the second shape, 7.6 mm to 8.8 mm for the third shape, and 7.5 mm to 8.7 mm for the fourth shape.

4. The set according to claim 2, wherein the major axis is at least approximately perpendicular to a plane spanned by the centerlines.

5. The set according to claim 4, wherein the minor axis is perpendicular to the major axis (MA).

6. The set according to claim 1, wherein the ear piece comprises an elastic material.

7. The set of claim 6, wherein the material is silicone.

8. The set of claim 6, wherein the material has a shore A hardness of at most 70.

9. The set according to claim 1, having a wall thickness of at most 1.5 mm.

10. The set according to claim 9, having a wall thickness of at most 0.7 mm.

11. The set according to claim 1, made by molding, casting or thermoforming.

12. Use of the set according to claim 1 as a temporary solution for a customer.

13. The use of claim 12, wherein the set of four or more ear pieces is provided to the customer while producing a customized ear piece.

* * * * *